United States Patent
Bolourchi et al.

(10) Patent No.: US 11,884,324 B2
(45) Date of Patent: Jan. 30, 2024

(54) SYSTEMS AND METHODS FOR INDUCING SPEED REDUCTION RESPONSIVE TO DETECTING A SURFACE HAVING A RELATIVELY LOW COEFFICIENT OF FRICTION

(71) Applicant: STEERING SOLUTIONS IP HOLDING CORPORATION, Saginaw, MI (US)

(72) Inventors: Farhad Bolourchi, Auburn Hills, MI (US); Zaki Ryne, Rochester Hills, MI (US); Juliette M. Rambourg, Auburn Hills, MI (US); Lei Wang, Auburn Hills, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 83 days.

(21) Appl. No.: 17/749,923

(22) Filed: May 20, 2022

(65) Prior Publication Data
US 2023/0373562 A1 Nov. 23, 2023

(51) Int. Cl.
| | | |
|---|---|---|
| *B62D 15/02* | (2006.01) | |
| *B62D 6/00* | (2006.01) | |
| *B62D 5/04* | (2006.01) | |
| *B60W 50/16* | (2020.01) | |

(52) U.S. Cl.
CPC .......... *B62D 15/029* (2013.01); *B60W 50/16* (2013.01); *B62D 5/0481* (2013.01); *B62D 6/006* (2013.01); *B62D 6/008* (2013.01); *B62D 15/025* (2013.01)

(58) Field of Classification Search
None
See application file for complete search history.

(56) References Cited

U.S. PATENT DOCUMENTS

| | | | | |
|---|---|---|---|---|
| 7,729,830 | B2 * | 6/2010 | Tarasinski | B60Q 9/00 |
| | | | | 701/1 |
| 10,800,445 | B2 * | 10/2020 | Longuemare | B62D 6/007 |
| 10,913,491 | B2 * | 2/2021 | Lesbirel | B60W 20/00 |
| 11,052,916 | B2 * | 7/2021 | Tsukasaki | B60W 50/0098 |
| 11,318,962 | B2 * | 5/2022 | Safour | B60W 50/16 |
| 2018/0251066 | A1 * | 9/2018 | Murata | B60W 30/12 |

* cited by examiner

*Primary Examiner* — Todd Melton
(74) *Attorney, Agent, or Firm* — Dickinson Wright PLLC

(57) ABSTRACT

A method includes identifying at least a portion of a surface that has a coefficient of friction that is less than a coefficient of friction threshold. The method also incudes determining whether a vehicle speed is greater than a vehicle speed threshold, and determining whether an operator of the vehicle is engaging a handwheel of the vehicle. The method also includes, generating a first alert signal, selectively adjusting at least one steering characteristic of a steering system of the vehicle from a first value to a second value, and, in response to at least one of a reduction in the vehicle speed and a distance between the vehicle and the portion of the surface having the coefficient of friction being less than a distance threshold, selectively adjusting the at least one steering characteristic from the second value to the first value.

20 Claims, 4 Drawing Sheets

SYSTEMS AND METHODS FOR INDUCING SPEED REDUCTION RESPONSIVE TO DETECTING A SURFACE HAVING A RELATIVELY LOW COEFFICIENT OF FRICTION

TECHNICAL FIELD

This disclosure relates to vehicle control and, in particular to systems and methods for inducing speed reduction responsive to detecting a surface having a relatively low coefficient of friction.

BACKGROUND OF THE INVENTION

A vehicle, such as a car, truck, sport utility vehicle, crossover, mini-van, marine craft, aircraft, all-terrain vehicle, recreational vehicle, or other suitable forms of transportation, typically includes various systems, such as a steering system, which may include an electronic power steering (EPS) system, a steer-by-wire (SbW) steering system, a hydraulic steering system, or other suitable steering system and/or other suitable systems (e.g., such as a braking system, propulsion system, and the like). Such systems of the vehicle typically controls various aspects of vehicle steering (e.g., including providing steering assist to an operator of the vehicle, controlling steerable wheels of the vehicle, and the like), vehicle propulsion, vehicle braking, and the like.

Such a vehicle may also include one or more operator assistance systems, such as one or more advanced driver assistance system (ADAS) technologies, which may provide the operator with various real-time alerts (e.g., blind spot alerts, lane keeping assist alerts, obstacle alerts, and the like). However, besides traffic conditions, such systems typically do not provide the operator with information regarding road conditions that are on the road ahead of the vehicle.

SUMMARY OF THE INVENTION

This disclosure relates generally to vehicle control.

An aspect of the disclosed embodiments includes a method for vehicle control. The method includes identifying, for a surface being traversed by a vehicle, at least a portion of the surface that has a coefficient of friction that is less than a coefficient of friction threshold. The method also incudes determining, responsive to identifying the portion of the surface has a coefficient of friction that is less than the coefficient of friction threshold, whether a vehicle speed is greater than a vehicle speed threshold, and, in response to determining that the vehicle speed is greater than the vehicle speed threshold, determining whether an operator of the vehicle is engaging a handwheel of the vehicle. The method also includes, in response to determining that the operator of the vehicle is engaging the handwheel of the vehicle, generating a first alert signal, selectively adjusting, after a predetermined period, at least one steering characteristic of a steering system of the vehicle from a first value to a second value, and, in response to at least one of a reduction in the vehicle speed and a distance between the vehicle and the portion of the surface having the coefficient of friction being less than a distance threshold, selectively adjusting the at least one steering characteristic from the second value to the first value.

Another aspect of the disclosed embodiments includes a system for vehicle control. The system includes a processor and a memory. The memory includes instructions that, when executed by the processor, cause the processor to: identify, for a surface being traversed by a vehicle, at least a portion of the surface that has a coefficient of friction that is less than a coefficient of friction threshold; determine, responsive to identifying the portion of the surface has a coefficient of friction that is less than the coefficient of friction threshold, whether a vehicle speed is greater than a vehicle speed threshold; in response to determining that the vehicle speed is greater than the vehicle speed threshold, determine whether an operator of the vehicle is engaging a handwheel of the vehicle; and, in response to determining that the operator of the vehicle is engaging the handwheel of the vehicle: generate a first alert signal; selectively adjust, after a predetermined period, at least one steering characteristic of a steering system of the vehicle from a first value to a second value; and, in response to at least one of a reduction in the vehicle speed and a distance between the vehicle and the portion of the surface having the coefficient of friction being less than a distance threshold, selectively adjust the at least one steering characteristic from the second value to the first value.

Another aspect of the disclosed embodiments includes an apparatus for vehicle control. The apparatus includes a processor and a memory. The memory includes instructions that, when executed by the processor, cause the processor to: identify, for a surface being traversed by a vehicle, at least a portion of the surface that has a coefficient of friction that is less than a coefficient of friction threshold; determine, responsive to identifying the portion of the surface has a coefficient of friction that is less than the coefficient of friction threshold, whether a vehicle speed is greater than a vehicle speed threshold; in response to determining that the vehicle speed is greater than the vehicle speed threshold, determine whether an operator of the vehicle is engaging a handwheel of the vehicle based on at least one handwheel signal; in response to determining that the operator of the vehicle is engaging the handwheel of the vehicle: generate a first alert signal; selectively adjust, after a predetermined period, at least one steering characteristic of a steering system of the vehicle from a first value to a second value; and, in response to at least one of a reduction in the vehicle speed and a distance between the vehicle and the portion of the surface having the coefficient of friction being less than a distance threshold, selectively adjust the at least one steering characteristic from the second value to the first value; and, in response to determining that the operator of the vehicle is not engaging the handwheel of the vehicle, generate a second alert signal.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
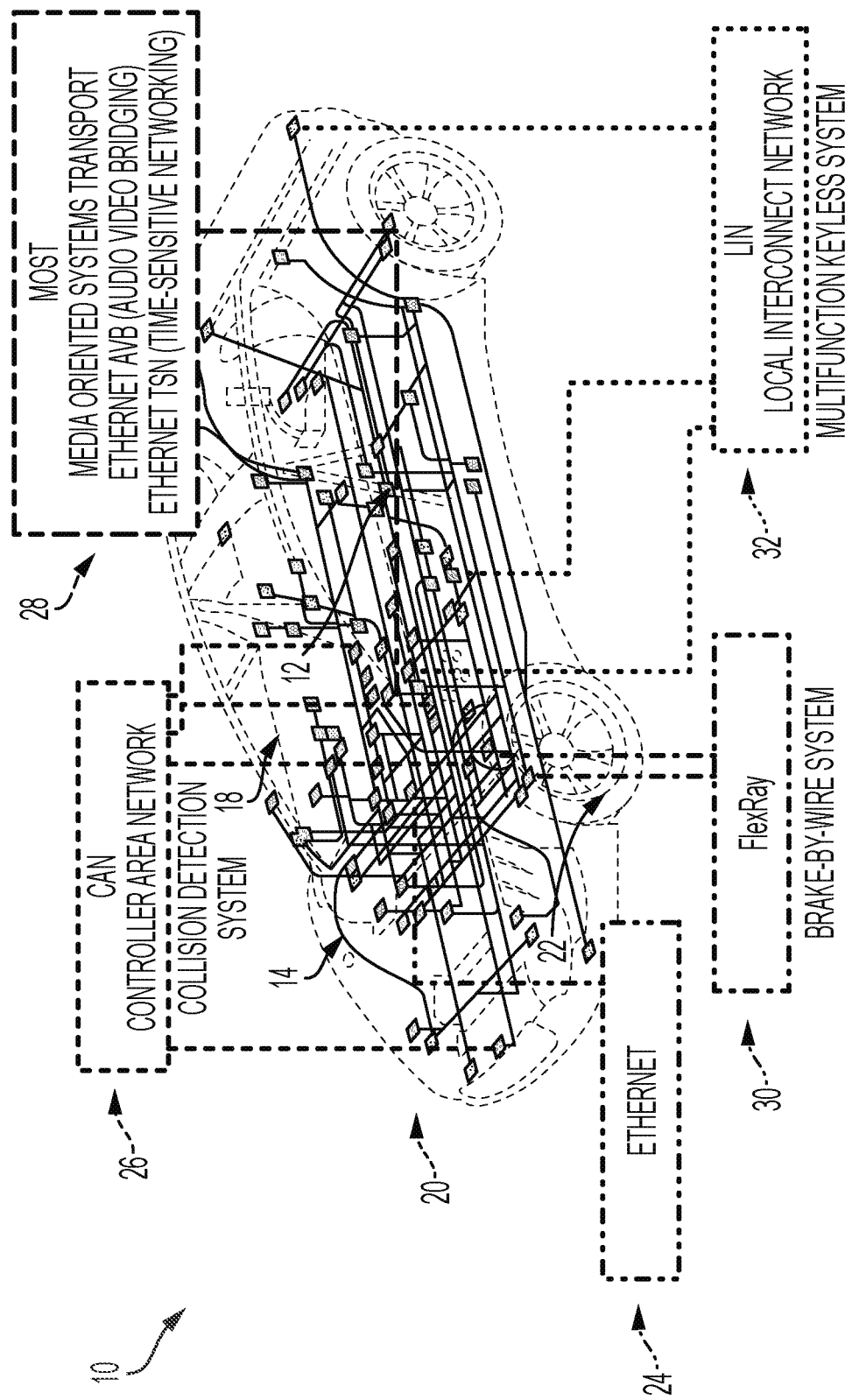
FIG. 1 generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes various systems, such as a steering system, which may include an electronic power steering (EPS) system, a steer-by-wire (SbW) steering system, a hydraulic steering system, or other suitable steering system and/or other suitable systems (e.g., such as a braking system, propulsion system, and the like). Such systems of the vehicle typically controls various aspects of vehicle steering (e.g., including providing steering assist to an operator of the vehicle, controlling steerable wheels of the vehicle, and the like), vehicle propulsion, vehicle braking, and the like.

The vehicle may also include one or more operator assistance systems, such as one or more advanced driver assistance system (ADAS) technologies, which may provide the operator with various real-time alerts (e.g., blind spot alerts, lane keeping assist alerts, obstacle alerts, and the like). However, besides traffic conditions, such systems typically do not provide the operator with information regarding road conditions that are on the road ahead of the vehicle.

Accordingly, systems and methods, such as those described herein, configured to induce vehicle control in response to an identified road condition, may be desirable. In some embodiments, the systems and methods described herein may be configured to identify an issue with relatively minimal information about the dangers on the road ahead of the vehicle. The systems and methods described herein may be configured to address an issue with the usability of the advanced safety features of the vehicle. The systems and methods described herein may be configured to increase safety in no coefficient of friction (icy, slippery, and the like) road conditions, which may reduce economical costs associated with vehicle accidents resulting from such low coefficient of friction road surfaces.

In some embodiments, the systems and methods described herein may be configured to provide one or more alerts in the vehicle responsive to identified low coefficient of friction road conditions. The systems and methods described herein may be configured to use a steering system of the vehicle to adjust steering feel to alert the operator of dangers or road conditions on the road ahead of the vehicle. The systems and methods described herein may be configured to detect, while the vehicle is on a pre-low coefficient of friction road condition (e.g., 500 yards prior to the low coefficient of friction road condition or other suitable distance from the low coefficient of friction road condition), the low coefficient of friction road condition. The systems and methods described herein may be configured to alert the operator of the low coefficient of friction road condition prior to engaging the low coefficient of friction road condition. The systems and methods described herein may be configured to induce a steering feel that unconsciously encourages the operator to reduce vehicle speed.

The systems and methods described herein may be configured to use one or more digital alerts, visual alerts, audio alerts, and the like. The systems and methods described herein may be configured to reduce the feeling of steering control slightly and safely at high speeds, to unconsciously encourage the operator to reduce the vehicle speed and increase safety before impact with a portion of the road having a relatively low coefficient of friction. As used herein, a low coefficient of friction on a portion of the road includes a coefficient of friction resulting in reduced control of a vehicle on the portion of the road having the low coefficient of friction.

In some embodiments, the systems and methods described herein may be configured to adjust one or more steering parameters or characteristics, including, but not limited to, an assist scale, a base assist scale, a damping scale, a high frequency scale, a hysteresis compensation scale (e.g., which may be used to reduce the effect of friction), a pull compensation scale, a return scale, any other suitable steering characteristic, or a combination thereof. In some embodiments, a value for each of the steering characteristics may be initially set to a first value and adjusted to a second value. The range of values may include any suitable range, such as 1 units to 5 units, or any other suitable range or absolute value.

In some embodiments, the systems and methods described herein may be configured to determine whether the operator, in response to the change in steering feel, has reduced vehicle speed (e.g., below a speed threshold or within a range or other suitable value corresponding to the reduction of speed). The systems and methods described herein may be configured to, in response to determining that the operator reduced the vehicle speed, return steering feel to normal (e.g., to the characteristic values prior to adjusting to change the steering feel). Alternatively, the systems and methods described herein may be configured to, in response to determining that the operator has not reduced speed and/or has increased speed, change the one or more steering characteristics to provide the adjusted steering feel to encourage the operator to reduce vehicle speed.

The systems and methods described herein may be configured to create of relatively small oscillation or oscillations in the handwheel of the vehicle to cause the operator to engage in steering the vehicle (e.g., because if the operator is traveling on a relatively straight portion of the road, such as on a highway, the operator may not be fully engaged in steering the vehicle and may not notice a change in steering feel). The systems and methods described herein may be configured to adjust one or more steering characteristics. For example, the systems and methods described herein may be configured to increase an assist scale characteristic, reduce a damping scale characteristic, and reduce a pull compensation scale characteristic. It should be understood that the systems and methods described herein may be configured to adjust any suitable steering characteristic to any suitable value.

The systems and methods described herein may be configured to, in response to a reduction in vehicle speed (e.g., below a threshold, to a desired speed, or any suitable amount of vehicle speed reduction), or in response to the vehicle being within a threshold distance from the low coefficient of friction road condition, reset the steering characteristics. The systems and methods described herein may be configured to use a dynamic change in one or more assist tables (e.g., from a "bath tub" shape, dynamically switch to a linear shape in the low torques, which is typically used at high speeds).

In some embodiments, the systems and methods described herein may be configured to obtain accurate Mu (e.g., coefficient of friction) information and accurate distance associated to a low Mu condition. The systems and methods described herein may be configured to alert the operator of the low Mu condition. The systems and methods described herein may be configured to encourage the operator to consciously or unconsciously take the targeted action(s) (e.g, reduce to target speed).

The systems and methods described herein may be configured to avoid impacting other vehicle operation tasks. The systems and methods described herein may be configured to visually, auditorily, haptically, or in another other suitable manner, alert the operator of the low Mu condition. The systems and methods described herein may be configured to progressively increase an invasiveness of the alert. The alert may indicate a target speed, indicate information regarding the low Mu condition, recommend a lane change, remind the operator to maneuver slowly and proceed with caution, recommend disengaging automatic propulsion features (e.g., cruise control and the like), and/or any other suitable information or recommendation.

In some embodiments, the systems and methods described herein may be configured to identify, using any suitable technique and/or sensors, for a surface being traversed by a vehicle, at least a portion of the surface that has a coefficient of friction that is less than a coefficient of friction threshold. The systems and methods described herein may be configured to determine, responsive to identifying the portion of the surface has a coefficient of friction that is less than the coefficient of friction threshold, whether a vehicle speed is greater than a vehicle speed threshold.

The systems and methods described herein may be configured to, in response to determining that the vehicle speed is greater than the vehicle speed threshold, determine whether an operator of the vehicle is engaging a handwheel of the vehicle. The systems and methods described herein may be configured to receive at least one handwheel signal (e.g., indicating a handwheel torque or other suitable information). The systems and methods described herein may be configured to determine whether the operator of the vehicle is engaging the handwheel of the vehicle based on the at least one handwheel signal. The systems and methods described herein may be configured to generate, in response to the operator engaging the handwheel of the vehicle, a first alert signal. The first alert signal may correspond to an oscillation (e.g., such as a slight oscillation or oscillations) of the handwheel of the vehicle, such that the vehicle does not change trajectory, but the handwheel oscillates, engaging the operator.

The systems and methods described herein may be configured to selectively adjust, after a predetermined period, at least one steering characteristic of a steering system of the vehicle from a first value to a second value. The at least one steering characteristic of the steering system includes at least one of an assist steering characteristic, a damping steering characteristic, a pull compensation steering characteristic, any other suitable steering characteristic including those described herein or other suitable steering characteristics, or a combination thereof.

The systems and methods described herein may be configured to, in response to at least one of a reduction in the vehicle speed and a distance between the vehicle and the portion of the surface having the coefficient of friction being less than a distance threshold, selectively adjust the at least one steering characteristic from the second value to the first value.

In some embodiments, the systems and methods described herein may be configured to, in response to determining that the operator of the vehicle is not engaging the handwheel of the vehicle, generate a second alert signal. The second alert signal may correspond to at least one of a visual indication, an audible indication, a haptic indication, any other suitable indication, or a combination thereof.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by a operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
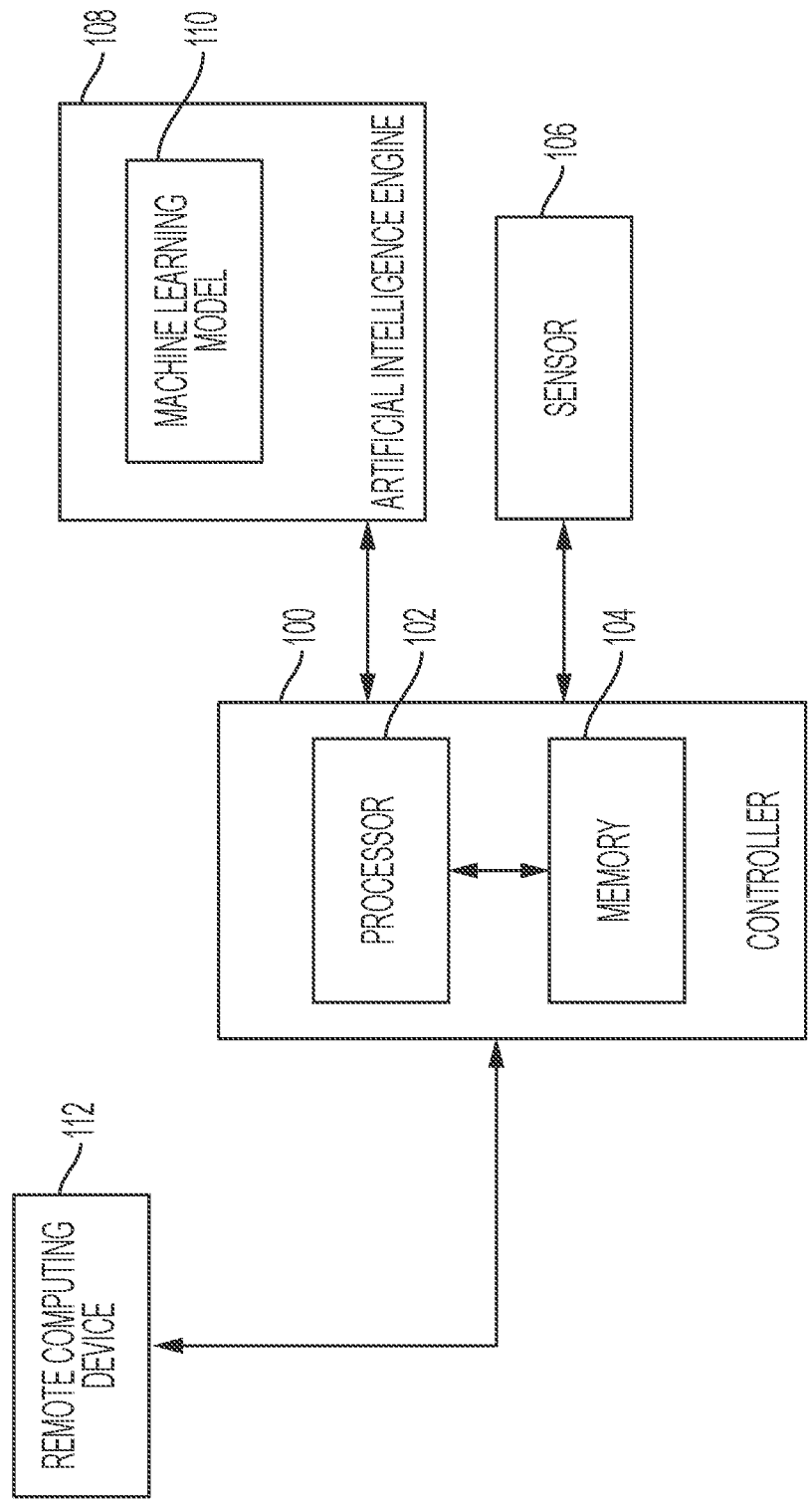
FIG. 2 generally illustrates a controller according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angel, a motor velocity, a vehicle speed, other suitable information, or a combination thereof.

In some embodiments, the controller 100 may use or include, an artificial intelligence engine 108 configured to perform one or more of aspects of the embodiments of systems and methods described herein. The artificial intelligence engine 108 may include any suitable artificial intelligence engine and may be disposed on the vehicle 10 and/or at least partially disposed on a remotely located computer, such as the remote computing device 112 (e.g., remote located from the vehicle 10). The remote computing device 112 may include any suitable remote computing device and may comprise at least a portion of a cloud computing device or infrastructure. The controller 100 may include a training engine capable of generating one or more machine learning models. Additionally, or alternatively, the machine learning model or models may be trained using any suitable training method and/or technique using any suitable computing device associated with or remote from the vehicle 10.

Figure 3:
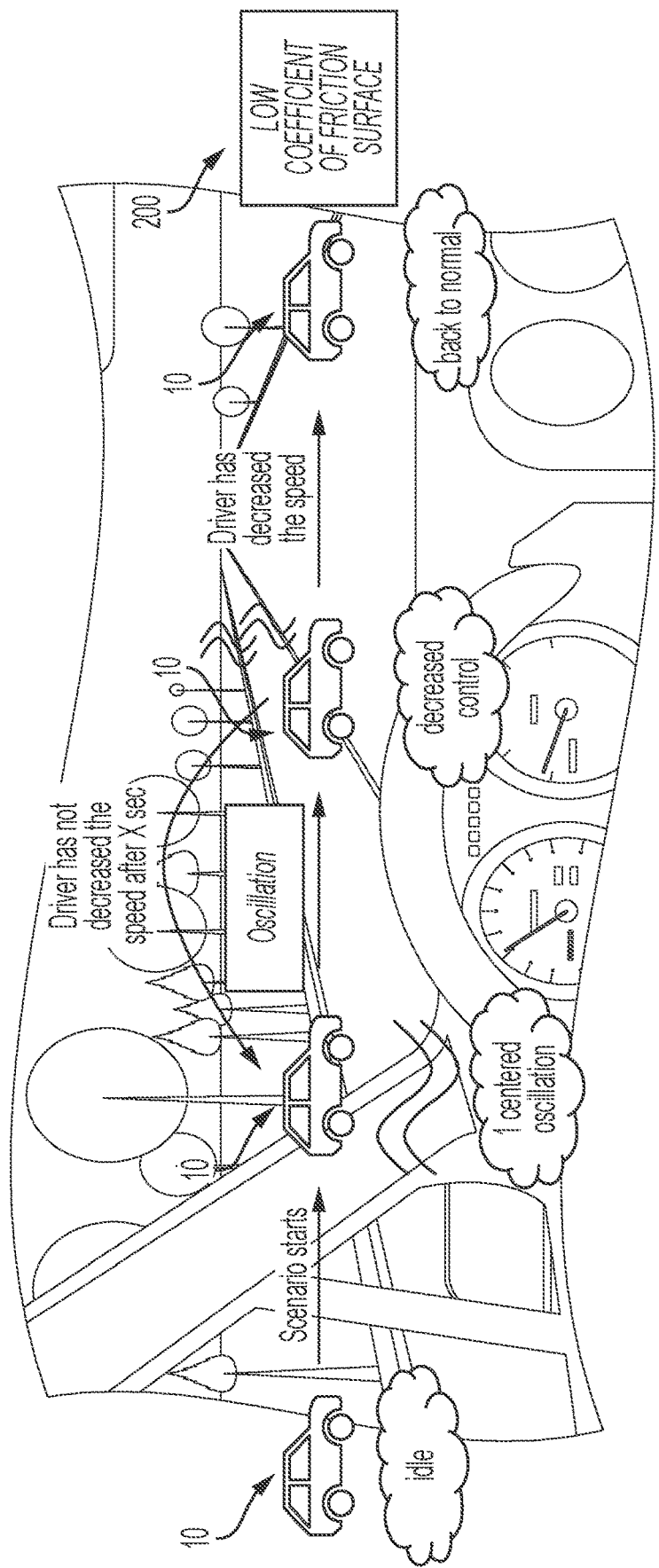
FIG. 3 generally illustrates a vehicle control diagram according to the principles of the present disclosure.

In some embodiments, as is generally illustrated in FIGS. 2 and 3, the controller 100 may be configured to adjust steering feel of the vehicle 10 to alert the operator of a low coefficient of friction surface or condition 200. The controller 100 may identify, using any suitable technique and/or sensors, the low coefficient of friction surface 200. The controller 100 may determine, responsive to identifying the low coefficient surface 200 has a coefficient of friction that is less than the coefficient of friction threshold, whether a vehicle speed of the vehicle 10 is greater than a vehicle speed threshold.

The controller 100 may, in response to determining that the vehicle speed is greater than the vehicle speed threshold, determine whether the operator of the vehicle 10 is engaging the handwheel of the vehicle 10. For example, the controller 100 may receive at least one handwheel signal (e.g., indicating a handwheel torque or other suitable information). The controller 100 may determine whether the operator of the vehicle 10 is engaging the handwheel of the vehicle 10 based on the at least one handwheel signal.

The controller 100 may generate, in response to the operator engaging the handwheel of the vehicle 10, a first alert signal. The first alert signal may correspond to an oscillation (e.g., such as a slight oscillation or oscillations) of the handwheel of the vehicle 10, such that the vehicle 10 does not change trajectory, but the handwheel oscillates, engaging the operator.

The controller 100 may selectively adjust, after a predetermined period (e.g., which may include any suitable period), at least one steering characteristic of a steering system of the vehicle 10 from a first value to a second value. The at least one steering characteristic of the steering system includes at least one of an assist steering characteristic, a damping steering characteristic, a pull compensation steering characteristic, any other suitable steering characteristic including those described herein or other suitable steering characteristics, or a combination thereof.

The controller 100 may, in response to at least one of a reduction in the vehicle speed and a distance between the vehicle 10 and the low coefficient of friction surface 200 being less than a distance threshold, selectively adjust the at least one steering characteristic from the second value to the first value.

In some embodiments, the controller 100 may, in response to determining that the operator of the vehicle 10 is not engaging the handwheel of the vehicle 10, generate a second alert signal. The second alert signal may correspond to at least one of a visual indication, an audible indication, a haptic indication, any other suitable indication, or a combination thereof.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 4:
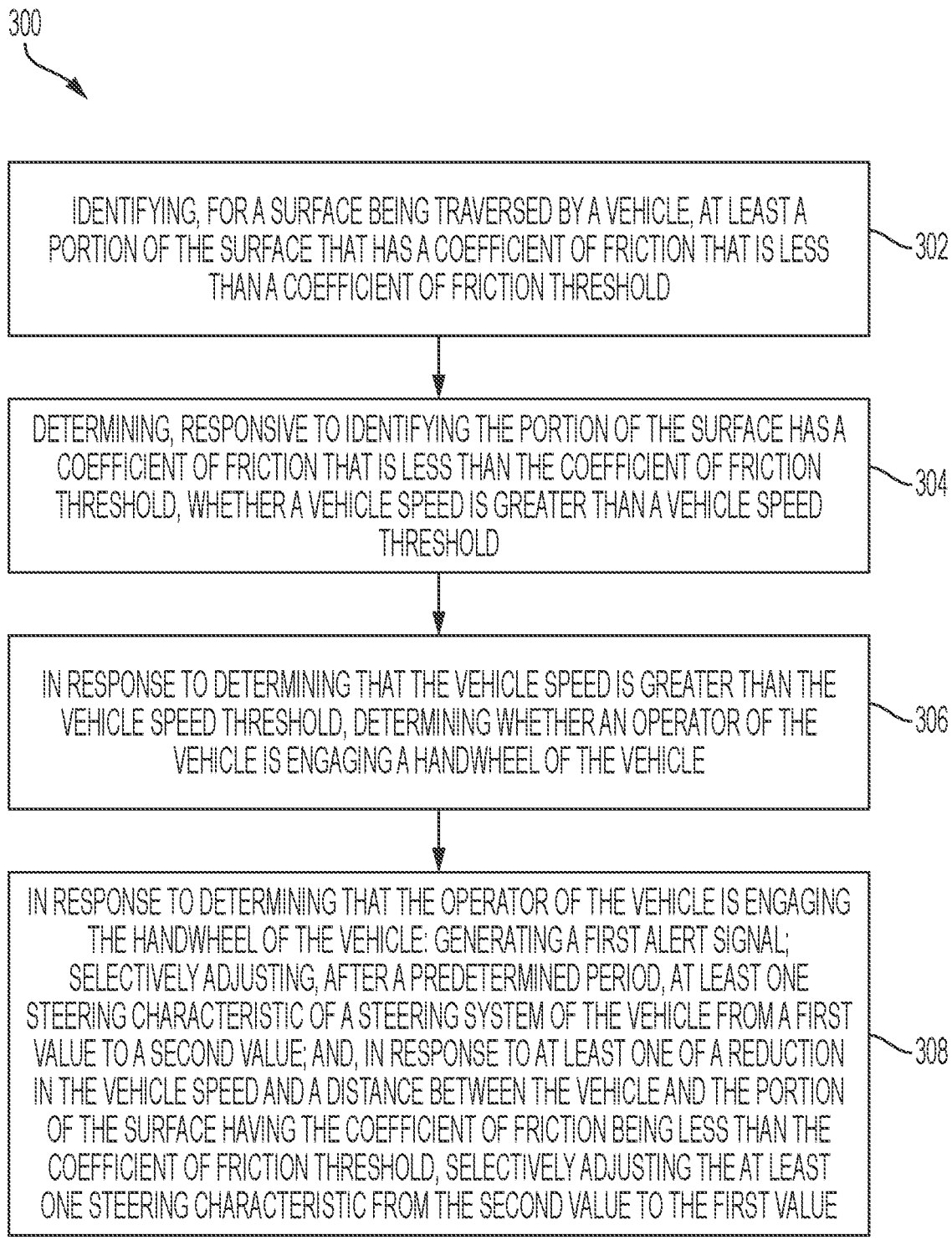
FIG. 4 is a flow diagram generally illustrating vehicle control method according to the principles of the present disclosure.

FIG. 4 is a flow diagram generally illustrating vehicle control method 300 according to the principles of the present disclosure. At 302, the method 300 identifies, for a surface being traversed by a vehicle, at least a portion of the surface that has a coefficient of friction that is less than a coefficient of friction threshold. For example, the controller 100 may identify the low coefficient of friction surface 200.

At 304, the method 300 determines, responsive to identifying the portion of the surface has a coefficient of friction that is less than the coefficient of friction threshold, whether a vehicle speed is greater than a vehicle speed threshold. For example, the controller 100 may determine, responsive to the low coefficient of friction surface having a coefficient of friction that is less than the coefficient of friction threshold, whether the vehicle speed is greater than the vehicle speed threshold.

At 306, the method 300, in response to determining that the vehicle speed is greater than the vehicle speed threshold, determines whether an operator of the vehicle is engaging a handwheel of the vehicle. For example, the controller 100 may, in response to determining that the vehicle speed is greater than the vehicle speed threshold, determine whether the operator of the vehicle 10 is engaging the handwheel of the vehicle 10.

At 308, the method 300, in response to determining that the operator of the vehicle is engaging the handwheel of the vehicle, generates a first alert signal, selectively adjusts, after a predetermined period, at least one steering characteristic of a steering system of the vehicle from a first value to a second value, and, in response to at least one of a reduction in the vehicle speed and a distance between the vehicle and the portion of the surface having the coefficient of friction being less than a distance threshold, selectively adjusts the at least one steering characteristic from the second value to the first value. For example, the controller 100 may, in response to determining that the operator of the vehicle is engaging the handwheel of the vehicle, generate the first alert signal, selectively adjust, after a predetermined period, the at least one steering characteristic of the steering system of the vehicle 10 from a first value to a second value, and, in response to at least one of a reduction in the vehicle speed and the distance between the vehicle 10 and the low coefficient of friction surface 200 being less than the distance threshold, selectively adjust the at least one steering characteristic from the second value to the first value.

In some embodiments, a method for vehicle control includes identifying, for a surface being traversed by a vehicle, at least a portion of the surface that has a coefficient of friction that is less than a coefficient of friction threshold. The method also incudes determining, responsive to identifying the portion of the surface has a coefficient of friction that is less than the coefficient of friction threshold, whether a vehicle speed is greater than a vehicle speed threshold, and, in response to determining that the vehicle speed is greater than the vehicle speed threshold, determining whether an operator of the vehicle is engaging a handwheel of the vehicle. The method also includes, in response to determining that the operator of the vehicle is engaging the handwheel of the vehicle, generating a first alert signal, selectively adjusting, after a predetermined period, at least one steering characteristic of a steering system of the vehicle from a first value to a second value, and, in response to at least one of a reduction in the vehicle speed and a distance between the vehicle and the portion of the surface having the coefficient of friction being less than a distance threshold, selectively adjusting the at least one steering characteristic from the second value to the first value.

In some embodiments, determining whether the operator of the vehicle is engaging the handwheel of the vehicle includes receiving at least one handwheel signal, and determining whether the operator of the vehicle is engaging the handwheel of the vehicle based on the at least one handwheel signal. In some embodiments, the at least one handwheel signal indicates at least a torque applied to the handwheel of the vehicle. In some embodiments, the at least one steering characteristic of the steering system includes at least one of an assist steering characteristic, a damping steering characteristic, and a pull compensation steering characteristic. In some embodiments, the first alert signal corresponds to an oscillation of the handwheel of the vehicle. In some embodiments, the method also includes, in response to determining that the operator of the vehicle is not engaging the handwheel of the vehicle, generating a second alert signal. In some embodiments, the second alert signal corresponds to at least one of a visual indication, an audible indication, and a haptic indication. In some embodiments, the steering system includes an electronic power steering system. In some embodiments, the steering system includes a steer-by-wire steering system.

In some embodiments, a system for vehicle control includes a processor and a memory. The memory includes instructions that, when executed by the processor, cause the processor to: identify, for a surface being traversed by a vehicle, at least a portion of the surface that has a coefficient of friction that is less than a coefficient of friction threshold;

determine, responsive to identifying the portion of the surface has a coefficient of friction that is less than the coefficient of friction threshold, whether a vehicle speed is greater than a vehicle speed threshold; in response to determining that the vehicle speed is greater than the vehicle speed threshold, determine whether an operator of the vehicle is engaging a handwheel of the vehicle; and, in response to determining that the operator of the vehicle is engaging the handwheel of the vehicle: generate a first alert signal; selectively adjust, after a predetermined period, at least one steering characteristic of a steering system of the vehicle from a first value to a second value; and, in response to at least one of a reduction in the vehicle speed and a distance between the vehicle and the portion of the surface having the coefficient of friction being less than a distance threshold, selectively adjust the at least one steering characteristic from the second value to the first value.

In some embodiments, the instructions further cause the processor to determine whether the operator of the vehicle is engaging the handwheel of the vehicle by receiving at least one handwheel signal, and determining whether the operator of the vehicle is engaging the handwheel of the vehicle based on the at least one handwheel signal. In some embodiments, the at least one handwheel signal indicates at least a torque applied to the handwheel of the vehicle. In some embodiments, the at least one steering characteristic of the steering system includes at least one of an assist steering characteristic, a damping steering characteristic, and a pull compensation steering characteristic. In some embodiments, the first alert signal corresponds to an oscillation of the handwheel of the vehicle. In some embodiments, the instructions further cause the processor to, in response to determining that the operator of the vehicle is not engaging the handwheel of the vehicle, generate a second alert signal. In some embodiments, the second alert signal corresponds to at least one of a visual indication, an audible indication, and a haptic indication. In some embodiments, the steering system includes an electronic power steering system. In some embodiments, the steering system includes a steer-by-wire steering system.

In some embodiments, an apparatus for vehicle control includes a processor and a memory. The memory includes instructions that, when executed by the processor, cause the processor to: identify, for a surface being traversed by a vehicle, at least a portion of the surface that has a coefficient of friction that is less than a coefficient of friction threshold; determine, responsive to identifying the portion of the surface has a coefficient of friction that is less than the coefficient of friction threshold, whether a vehicle speed is greater than a vehicle speed threshold; in response to determining that the vehicle speed is greater than the vehicle speed threshold, determine whether an operator of the vehicle is engaging a handwheel of the vehicle based on at least one handwheel signal; in response to determining that the operator of the vehicle is engaging the handwheel of the vehicle: generate a first alert signal; selectively adjust, after a predetermined period, at least one steering characteristic of a steering system of the vehicle from a first value to a second value; and, in response to at least one of a reduction in the vehicle speed and a distance between the vehicle and the portion of the surface having the coefficient of friction being less than a distance threshold, selectively adjust the at least one steering characteristic from the second value to the first value; and, in response to determining that the operator of the vehicle is not engaging the handwheel of the vehicle, generate a second alert signal.

In some embodiments, the at least one steering characteristic of the steering system includes at least one of an assist steering characteristic, a damping steering characteristic, and a pull compensation steering characteristic.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for vehicle control, the method comprising:
identifying, for a surface being traversed by a vehicle, at least a portion of the surface that has a coefficient of friction that is less than a coefficient of friction threshold;
determining, responsive to identifying the portion of the surface has a coefficient of friction that is less than the coefficient of friction threshold, whether a vehicle speed is greater than a vehicle speed threshold;
in response to determining that the vehicle speed is greater than the vehicle speed threshold, determining whether an operator of the vehicle is engaging a handwheel of the vehicle; and
in response to determining that the operator of the vehicle is engaging the handwheel of the vehicle:
generating a first alert signal;
selectively adjusting, after a predetermined period, at least one steering characteristic of a steering system of the vehicle from a first value to a second value; and
in response to at least one of a reduction in the vehicle speed and a distance between the vehicle and the portion of the surface having the coefficient of friction being less than a distance threshold, selectively adjusting the at least one steering characteristic from the second value to the first value.

2. The method of claim 1, wherein determining whether the operator of the vehicle is engaging the handwheel of the vehicle includes:
receiving at least one handwheel signal; and
determining whether the operator of the vehicle is engaging the handwheel of the vehicle based on the at least one handwheel signal.

3. The method of claim 2, wherein the at least one handwheel signal indicates at least a torque applied to the handwheel of the vehicle.

4. The method of claim 1, wherein the at least one steering characteristic of the steering system includes at least one of an assist steering characteristic, a damping steering characteristic, and a pull compensation steering characteristic.

5. The method of claim 1, wherein the first alert signal corresponds to an oscillation of the handwheel of the vehicle.

6. The method of claim 1, further comprising, in response to determining that the operator of the vehicle is not engaging the handwheel of the vehicle, generating a second alert signal.

7. The method of claim 6, wherein the second alert signal corresponds to at least one of a visual indication, an audible indication, and a haptic indication.

8. The method of claim 1, wherein the steering system includes an electronic power steering system.

9. The method of claim 1, wherein the steering system includes a steer-by-wire steering system.

10. A system for vehicle control, the system comprising:
a processor; and
a memory including instructions that, when executed by the processor, cause the processor to:
identify, for a surface being traversed by a vehicle, at least a portion of the surface that has a coefficient of friction that is less than a coefficient of friction threshold;
determine, responsive to identifying the portion of the surface has a coefficient of friction that is less than the coefficient of friction threshold, whether a vehicle speed is greater than a vehicle speed threshold;
in response to determining that the vehicle speed is greater than the vehicle speed threshold, determine whether an operator of the vehicle is engaging a handwheel of the vehicle; and
in response to determining that the operator of the vehicle is engaging the handwheel of the vehicle:
generate a first alert signal;
selectively adjust, after a predetermined period, at least one steering characteristic of a steering system of the vehicle from a first value to a second value; and
in response to at least one of a reduction in the vehicle speed and a distance between the vehicle and the portion of the surface having the coefficient of friction being less than a distance threshold, selectively adjust the at least one steering characteristic from the second value to the first value.

11. The system of claim 10, wherein the instructions further cause the processor to determine whether the operator of the vehicle is engaging the handwheel of the vehicle by:
receiving at least one handwheel signal; and
determining whether the operator of the vehicle is engaging the handwheel of the vehicle based on the at least one handwheel signal.

12. The system of claim 11, wherein the at least one handwheel signal indicates at least a torque applied to the handwheel of the vehicle.

13. The system of claim 10, wherein the at least one steering characteristic of the steering system includes at least one of an assist steering characteristic, a damping steering characteristic, and a pull compensation steering characteristic.

14. The system of claim 10, wherein the first alert signal corresponds to an oscillation of the handwheel of the vehicle.

15. The system of claim 10, wherein the instructions further cause the processor to, in response to determining that the operator of the vehicle is not engaging the handwheel of the vehicle, generate a second alert signal.

16. The system of claim 15, wherein the second alert signal corresponds to at least one of a visual indication, an audible indication, and a haptic indication.

17. The system of claim 10, wherein the steering system includes an electronic power steering system.

18. The system of claim 10, wherein the steering system includes a steer-by-wire steering system.

19. An apparatus for vehicle control, the apparatus comprising:
- a processor; and
- a memory including instructions that, when executed by the processor, cause the processor to:
  - identify, for a surface being traversed by a vehicle, at least a portion of the surface that has a coefficient of friction that is less than a coefficient of friction threshold;
  - determine, responsive to identifying the portion of the surface has a coefficient of friction that is less than the coefficient of friction threshold, whether a vehicle speed is greater than a vehicle speed threshold;
  - in response to determining that the vehicle speed is greater than the vehicle speed threshold, determine whether an operator of the vehicle is engaging a handwheel of the vehicle based on at least one handwheel signal;
  - in response to determining that the operator of the vehicle is engaging the handwheel of the vehicle:
    - generate a first alert signal;
    - selectively adjust, after a predetermined period, at least one steering characteristic of a steering system of the vehicle from a first value to a second value; and
  - in response to at least one of a reduction in the vehicle speed and a distance between the vehicle and the portion of the surface having the coefficient of friction being less than a distance threshold, selectively adjust the at least one steering characteristic from the second value to the first value; and
  - in response to determining that the operator of the vehicle is not engaging the handwheel of the vehicle, generate a second alert signal.

20. The apparatus of claim 19, wherein the at least one steering characteristic of the steering system includes at least one of an assist steering characteristic, a damping steering characteristic, and a pull compensation steering characteristic.

* * * * *